US006172775B1

(12) United States Patent
Wang et al.

(10) Patent No.: US 6,172,775 B1
(45) Date of Patent: Jan. 9, 2001

(54) COMPOSITION FOR REPAIRING AND REMOVING SCRATCHES FROM PHOTOGRAPHIC SURFACES

(75) Inventors: Yongcai Wang, Penfield; Jeffrey A. Trest; Alfred B. Fant, both of Rochester, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/207,376

(22) Filed: Dec. 8, 1998

(51) Int. Cl.$^7$ .................................................. H04N 1/04

(52) U.S. Cl. .......................... 358/474; 358/475; 359/196; 359/208; 359/209; 359/211; 359/213; 430/523; 430/531; 430/536; 524/31; 524/32

(58) Field of Search .................................... 358/474, 475; 359/196, 208, 209, 211, 213; 430/523, 531, 536; 524/31, 32

(56) References Cited

U.S. PATENT DOCUMENTS

| | | | | |
|---|---|---|---|---|
| 4,582,784 | | 4/1986 | Fukugawa et al. | 430/531 |
| 4,735,976 | | 4/1988 | Steklenski et al. | 524/32 |
| 5,221,975 | | 6/1993 | Kessler | 358/474 |
| 5,255,114 | | 10/1993 | Kessler | 359/196 |
| 5,376,434 | | 12/1994 | Ogawa et al. | 528/176 |
| 5,641,345 | * | 6/1997 | Henry | 528/176 |

FOREIGN PATENT DOCUMENTS

| | | |
|---|---|---|
| 218 655 | 4/1942 | (CH) . |
| 19 11 314 | 10/1969 | (DE) . |
| 580 261 | 9/1946 | (GB) . |
| 27 983 | 5/1946 | (LU) . |

* cited by examiner

*Primary Examiner*—Terressa M. Boykin
(74) *Attorney, Agent, or Firm*—Doreen N. Wells; Carl F. Ruoff

(57) ABSTRACT

The present invention is a composition for removing scratches from photographic elements. The composition includes a solvent, an abrasive particle, a petroleum distillate, hard wax and water.

19 Claims, No Drawings

COMPOSITION FOR REPAIRING AND REMOVING SCRATCHES FROM PHOTOGRAPHIC SURFACES

CROSS REFERENCE TO RELATED APPLICATIONS

This application relates to commonly assigned copending application Ser. No. 09/207/446, filed simultaneously herewith incorporated by reference herein.

FIELD OF THE INVENTION

The present invention relates to methods for removing scratches and other imperfections on the surface of a photographic material. More particularly, the present invention is directed to wax compositions which can be used to remove scratches and other defects from the surface of a photographic material in order to improve the quality of photographic prints or projected photographic images or scanned images by an optical scanner in the situation where the surface of the photographic material have become scratched or contaminated.

BACKGROUND OF THE INVENTION

Photographic light-sensitive materials are generally composed of light-sensitive photographic emulsion layers and light insensitive layers such as an interlayer, an emulsion protective layer, a filter layer, or an antihalation layer applied, directly or indirectly through a subbing layer, to one side or both sides of the support including, for example, an α-olefin such as polystyrene or polyethylene, a cellulose ester such as cellulose acetate or nitrocellulose, a polyester such as polyethylene terephthalate or polyethylene napththalate, paper, or a synthetic paper. In light-sensitive materials such as color photographic elements, auxiliary layers such as an antistatic layer, a curl preventing layer, a magnetic recording layer, a barrier layer, a scratch resistant overcoat layer, or a surface lubricant layer, are provided on the back side of the support in order to enhance photographic or physical quality of the photographic light-sensitive materials.

It is always desirable to have a backside protective overcoat that serves as many functions as possible in order to reduce manufacturing complexity and cost. It is also desirable to have such a layer formed by coating and drying from coating compositions based on solvents that are less hazardous to the environment.

Prior art has disclosed the use of a protective overcoat or a "barrier" layer to maintain post-process conductivity of an antistat. Typically such protective overcoats are composed of hydrophobic materials such as cellulose acetates, cellulose acetate butyrates, cellulose acetate propionates, cellulose nitrates, polyacrylates, polymethacrylates, polystyrene, and poly(vinyl acetal).

When such hydrophobic barrier layers are used as an outermost surface layer, deposition of material or "scum" formation on the outermost surface following photographic processing is commonly seen. For example, U.S. Pat. No. 4,735,976 discusses how surfactant from the final photographic processing solution, known as the stabilizer solution, can form a deposit on the outermost surface layer and thereby lead to an objectionable surface haze or scum. Similarly, U.S. Pat. No. 4,582,784 discusses the occurrence of spotted drying unevenness on the outermost surface. Another type of processing scum that is particularly troublesome is hard-water scum. Processing laboratories that are located in hard-water areas are particularly susceptible to this problem. After processing in solutions prepared using hard-water, a white hazy surface scum, sometimes uniform and sometimes more liney and streaky, can be seen on the film. Chemical analysis of the hard-water scum typically reveals hard-water salts of calcium, magnesium, and sodium.

Such surface deposits (contaminates) can impact the physical performance of the element in a variety of ways. For example, large deposits of material on a photographic film lead to readily visible defects on photographic prints or are visible upon display of motion picture film. Alternatively, post-processing debris can influence the ability of a processed film to be overcoated with an ultraviolet curable abrasion resistant layer, as is done in professional photographic processing laboratories employing materials such as PhotoGard, 3M. Finally, processing residue on photographic elements can impact the ability to read magnetically recorded information on a processed film, such as the new Advanced Photographic System films.

Of particular concern is during the handling of photographic materials such as coating, drying, finishing, winding, rewinding, processing, printing, and so on. The surfaces of the photographic material are often harmed by contact friction with the apparatus parts, or scratched by hard debris or objects such as dust, sand, grit, or any other abrasive materials attached to those apparatus. These scratches can deface the image during printing and projecting processes.

Heretofore, there have been various proposals to obtain a physically improved photographic material by increasing the abrasion and scratch resistance of the overcoat layer, or by reducing the contact friction of the photographic material to other surfaces so that it will not be damaged during the manufacturing, exposure, developing, and printing or projecting processes. For example, methods for improving the scratch resistance include adding a certain class of hardener to gelatin; using colloidal silica in the overcoat layer either alone or in combination with a water soluble polymer having a carboxylic acid group; using two overcoat layers, the upper layer containing a colloidal silica and the lower layer containing a polymer latex; and using a composite latex comprising a polymeric acrylic acid ester and/or a polymeric methacrylate acid ester and colloidal silica. Methods for reducing the contact friction include incorporating both a silicone fluid and a surface active agent into the protective overcoat; using a mixture of dimethyl silicone and diphenyl silicone on the backside of the support; incorporating a triphenyl terminated methyl phenyl silicone into the emulsion protective overcoat; using a combination of dimethyl silicone and beta-alanine derived surfactants; using modified sperm oils in the protective overcoat; using liquid organopolysiloxane with methyl and alkyl or aryl, or aralkyl side groups in the protective overcoat; and by using polysiloxane with polyether side chains on the backside of the support.

In recent years, the conditions under which photographic materials are manufactured and utilized have become more severe. This is either because applications of photographic elements have been extended to more harsh conditions such as high humidity and high temperature or because preparation methods have been advanced, including high speed coating, high speed finishing and cutting, and faster processing. Further, the emulsion layers have been progressively thinned. Under these conditions, photographic elements, and materials are more severely scratched and the above-mentioned methods have to be modified, or improved, or optimized for best protection.

Recent patents have described apparatus for scanning and digitizing photographic images. For example, U.S. Pat. Nos. 5,221,975 and 5,255,114 describe a high resolution scanner which is adapted to digitally record an image from a photographic film. The scanner comprises a folded integrating sphere which projects illumination on the film as the film is moved relative to the integrating sphere. Light transmitted through the film is directed to a photodetector by an optical system. It is expected that aforementioned surface scratches and contaminates can significantly influence the ability of the high resolution optical scanner to digitally record images from photographic films.

The foremost objective of the present invention is to provide wax compositions for removing scratches and other defects from the surface of a photographic material in order to improve the quality of photographic prints or projected photographic images or scanned images by an optical scanner in the situation where the surface of the photographic material have become scratched or contaminated.

SUMMARY OF THE INVENTION

The present invention is a composition for removing scratches from photographic elements. The composition includes a solvent, an abrasive particle, a petroleum distillate, hard wax and water.

DETAILED DESCRIPTION OF THE INVENTION

The present invention provides a wax composition for removing scratches and imperfections from a photographic material comprising preferably a hard wax having sufficient adhesion to the surface of the photographic material.

In a further embodiment of the invention, the wax composition comprises (a) a solvent for the surface of the photographic material, (b) an abrasive particle having an abrasive property that is effective in removing minor scratches and contaminate from a photographic material without having to remove much of the photographic material surface, (c) a petroleum distillate, (d) a hard wax, and (e) water.

The photographic material is treated by applying the wax composition to the exterior surface and rubbing the wax composition with sufficient force to treat substantially all the scratches and imperfections. Any remaining solvent is then allowed to evaporate and the residual wax composition is removed to produce a finished surface having restored optical properties for photographic printing or projection or scanning.

The present invention relates to a wax composition for removing scratches and imperfections from a photographic material by applying to the surface of the photographic material a wax composition. The wax composition removes or smoothes out of the grinding lines, scratches, pits, and certain other surface defects such as scum that adversely affect the use of the photographic material by printing, projecting, or scanning.

The wax composition is preferably applied by an application device comprising at least one of the following: a wax applicator roll comprising an open cell foam material impregnated with the wax composition; a sponge impregnated with the wax composition; or a spraying device atomizing the wax composition into droplets. A smoothing device is used to buff the surface of the photographic material having the applied wax composition.

The wax composition comprises preferably a hard wax that has sufficient adhesion to the surface. Suitable wax includes carnauba wax, candelilla wax, japan wax, ceresin wax, synthetic wax, and mixtures of wax. Carnauba wax is most preferred.

In a preferred embodiment, the wax composition is made of (a) a solvent, (b) an abrasive particle, (c) a petroleum distillate, (d) a hard wax, and (e) water. Such a composition can serve the dual function of removing minor surface scratches and contamination and filling deep surface scratches with hard wax material allowing the deep scratches to be less visible under light. The solvent is any solvent for the surface layer of the photographic material and enhances the action of the abrasive particles in removing the minor scratches and contaminate from the surface and forming a smooth new surface. Any solvent can be used including, for example, acetone, methylene chloride, methyl ethyl ketone, ethyl acetate, diacetyl alcohol, but the most preferred one is acetone. The abrasive particle having an abrasive property that is effective in removing minor scratches and contaminates from a photographic material without having to remove much of the photographic material surface. The abrasive particles have a mild abrasive property and preferably a particle size ranging from 0.01 to 4 microns, more preferably from 0.05 to 3 microns. If the abrasive particle is too large, the composition may damage the photographic element. If the abrasive particle is too small the composition is ineffective at removing scratches. Representative abrasive particles are aluminum oxide, crosslinked polymer beads, aluminum silicates, silicone dioxides, tin oxides, and mixture of these materials. The petroleum distillate serves the dual function of acting as carrier for the abrasive particles and as a solvent for the wax. Furthermore, it is believed that the petroleum distillate helps to clean and condition the surface of the photographic material. Suitable petroleum distillates include Narpar 15 from Chevron. Water is normally added in an amount to provide a desirable consistency to make the wax composition easily be impregnated by the applicator roll surface and spread to the surface of the photographic material. In the present invention, the wax composition preferably comprises about 15 to 25 wt. % of a solvent, 10 to 35 wt. % of an abrasive particle, 15 to 25 wt. % of a petroleum distillate, 5 to 20 wt. % of a hard wax, and 15 to 25 wt. % water. Other materials which can be added to the composition include oleic acid, stearic acid and oleic diethanol amide.

The photographic material according to the present invention comprises one or more imaging layers on one side of the support and on the other side of the support an outermost backing layer, or an outermost layer coated on the top of an antistatic layer, or an outermost layer coated on a magnetic recording layer. The outermost backing can be an abrasion resistance backing layer, a lubricant layer, or a scum control layer.

In a particularly preferred embodiment, the photographic material in accordance with this invention is a photographic film in which the image-forming layer is a radiation-sensitive silver halide emulsion layer. Such an emulsion layer typically comprises a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly (vinylpyrrolidone), and the like.

The photographic materials of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic material according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the elements of the present invention can contain auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, glass and the like. Details regarding supports and other layers of the photographic elements of this invention are contained in Research Disclosure, Item 36544, September 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in Research Disclosure, Item 36544, September 1994, and the references listed therein.

The photographic silver halide emulsions utilized in this invention can contain other addenda conventional in the photographic art. Useful addenda are described, for example, in Research Disclosure, Item 36544, September 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

EXAMPLES

Example 1

A Kodacolor Gold 400 film sample was developed in Process C 41 and was then placed on a rotating bed. Two arms each holding a CALIBRASE CS10F wheel (trademark of Taber Industries) were positioned such that the outer diameter of the wheel was in contact with the backside of the processed film. The load on each of the arms was 185 grams. The wheels rotated about their axis. The rotating bed was then allowed to make 100 revolutions under the rotating wheels. After the 100 revolutions of the bed, the sample was removed and examined by printing the abraded film sample onto photographic paper.

A wax composition containing 20 weight % acetone solvent, 15 weight % carnauba wax, 20 weight % petroleum distillate, 15 weight % water, 25 weight % quartz silica particles having a mean size of 1.5 microns, and 5 weight % oleic acid was applied to sections of the abraded film sample, which were then examined under reflection light. The sections that had the wax composition applied showed almost no visible scratches under reflected and transmitted light. The sections that were not treated with the wax compositions were loaded with visible scratches.

The invention has been described in detail with particular reference to certain preferred embodiments thereof, but it will be understood that variations and modifications can be effected within the spirit and scope of the invention.

What is claimed is:

1. A composition for removing scratches from the surface of photographic elements comprising:

a solvent for said surface of said photographic element;

a plurality of abrasive particles;

a hard wax with adhesion for said surface of said photographic element;

a petroleum distillate, said petroleum distillate being a solvent for said hard wax; and water.

2. The composition of claim 1 wherein the solvent comprises acetone.

3. The composition of claim 1 wherein the abrasive particles comprise a particle size ranging from 0.01 to 4 microns.

4. The composition of claim 1 wherein the abrasive particles comprise aluminum oxide, crosslinked polymer beads, aluminum silicates, silicone dioxides or tin oxides.

5. The composition of claim 1 wherein a weight percent of the solvent is from 15 to 25.

6. The composition of claim 1 wherein a weight percent of the abrasive particles is from 10 to 35.

7. The composition of claim 1 wherein a weight percent of the petroleum distillate is from 10 to 25.

8. The composition of claim 1 wherein a weight percent of the hard wax is from 2 to 20.

9. The composition of claim 1 wherein a weight percent of the water is from 15 to 25.

10. The composition of claim 1 wherein the hard wax comprises carnauba wax, candelilla wax, japan wax, ceresin wax or synthetic wax.

11. A composition for removing scratches from the surface of photographic elements comprising:

a solvent for said surface of said photographic element;

a plurality of abrasive particles each having a particle size ranging from 0.01 to 4 microns;

a hard wax with adhesion for said surface of said photographic element, a weight percent of said hard wax being from 2 to 20;

a petroleum distillate, said petroleum distillate being a solvent for said hard wax; and water.

12. The composition of claim 11 wherein the solvent comprises acetone.

13. The composition of claim 11 wherein the abrasive particles comprise aluminum oxide, crosslinked polymer beads, aluminum silicates, silicone dioxides or tin oxides.

14. The composition of claim 11 wherein a weight percent of the solvent is from 15 to 25.

15. The composition of claim 11 wherein a weight percent of the abrasive particles is from 10 to 35.

16. The composition of claim 11 wherein a weight percent of the petroleum distillate is from 10 to 25.

17. The composition of claim 11 wherein a weight percent of the water is from 15 to 25.

18. The composition of claim 11 wherein the hard wax comprises carnauba wax, candelilla wax, japan wax, ceresin wax or synthetic wax.

19. A composition for removing scratches from the surface of photographic elements comprising:

a solvent for said surface of said photographic element, a weight percent of said solvent being from 15 to 25;

a plurality of abrasive particles each having a particle size ranging from 0.01 to 4 microns, a weight percent of said abrasive particles being from 10 to 35;

a hard wax with adhesion for said surface of said photographic element, a weight percent of said hard wax being from 2 to 20;

a petroleum distillate, said petroleum distillate being a solvent for said hard wax, a weight percent of said petroleum distillate being from 10 to 25; and water, a weight percent of said water being from 15 to 25.

* * * * *